United States Patent
Kimber et al.

(10) Patent No.: US 6,222,855 B1
(45) Date of Patent: Apr. 24, 2001

(54) METHOD AND APPARATUS FOR CONVERTING BETWEEN DIFFERING DATA AND COMMAND EXCHANGE PROTOCOLS

(75) Inventors: Douglas Alan Kimber, Batavia; Philip Eugene Rynes, Woodridge, both of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/025,932

(22) Filed: Feb. 19, 1998

(51) Int. Cl.[7] ............................. H04J 3/16; G06F 15/16
(52) U.S. Cl. ..................... 370/466; 709/230; 370/463
(58) Field of Search ........................... 370/466, 400, 370/401, 465, 467, 395, 524, 463; 709/230

(56) References Cited

U.S. PATENT DOCUMENTS

| | | |
|---|---|---|
| 4,592,048 | 5/1986 | Beckner et al. . |
| 5,640,386 * | 6/1997 | Wiedeman ............................ 370/320 |
| 5,778,189 * | 7/1998 | Kimura et al. .................... 395/200.66 |
| 5,826,017 * | 10/1998 | Holzmann ........................... 395/200.6 |
| 5,905,873 * | 5/1999 | Hartmann et al. ............... 395/200.79 |
| 6,070,196 * | 5/2000 | Mullen, Jr. ............................ 709/250 |

* cited by examiner

Primary Examiner—Alpus H. Hsu
Assistant Examiner—Duc Ho

(57) ABSTRACT

A protocol converter converts from a first data and command exchange protocol to a second, different data and command exchange protocol. The protocol converter includes a first interface for sending and receiving data and commands in a first protocol, such as DSCH, and a second interface for sending and receiving data and commands in a second, different protocol, such as Ethernet. The device can receive data and commands simultaneously at either interface and convert from the first protocol to the second protocol or from the second protocol to the first protocol without loss of integrity to the flow of the data and commands. Additionally, the device provides a redundant connection, a safeguard in the event of primary path failure.

27 Claims, 4 Drawing Sheets

X = DEAD BIT; P = PARITY

THE LEGAL START CODES ARE:

| DATAH(3-0) (HEXADECIMAL) | DATAH(3-0) (HEXADECIMAL) | OPERATION |
|---|---|---|
| 3 | 3 | WRITE WORD |
| 3 | 5 | WRITE COMMAND |
| 3 | 9 | WRITE BLOCK |
| 5 | 3 | READ WORD |
| 5 | 5 | READ STATUS |
| 5 | 9 | READ BLOCK |
| 9 | 3 | SEND END OF TRANSMISSION |

THE LEGAL START CODES ARE:

| DATAH(3-0) (HEXADECIMAL) | DATAH(3-0) (HEXADECIMAL) | OPERATION |
|---|---|---|
| 3 | 3 | ALL SEEMS WELL |
| 3 | 5 | DEVICE REPORTED ERROR |
| 5 | 3 | ILLEGAL COMMAND |
| 5 | 5 | ILLEGAL START CODE |

METHOD AND APPARATUS FOR CONVERTING BETWEEN DIFFERING DATA AND COMMAND EXCHANGE PROTOCOLS

BACKGROUND OF THE INVENTION

1. Field of the Invention

This invention relates to a method and apparatus for communicating electronic data. Specifically, communication equipment using different data and command exchange protocols are linked in a redundant networking environment.

1. Description of the Prior Art

As computer technology has increased in complexity and usage, computer networks have incorporated a wide range of applications. Computer networks are used in all types of businesses, industries and institutions. However, in a computer network employing communications equipment, the network must be configured such that each of the respective processors may communicate with one another. Several different communications protocols could be involved. Therefore, a need exists to allow each transmitting device to send and receive data and commands in not only its own unique protocol, but also in the protocol used by the receiving device. Such a requirement creates the need for an interface that converts from one protocol to a second, different protocol.

Because of the critical nature of communications between devices in certain applications, such as in the communications industry, it is often necessary to provide for redundant connections to ensure communications will continue in the event that one communications path fails. A redundant communications path provides a safeguard against path failure of the primary communications path. It is therefore desirable to provide a protocol converting interface with the ability to provide a redundant communications path.

FIG. 1 shows the current state of the art and illustrates the problems the present invention overcomes. Existing connecting means between communications equipment has several limitations. FIG. 1 illustrates a reliance on using available hardware to link, for instance, a Lucent Technologies 5ESS® Switch described in U.S. Pat. No. 4,592,048 issued to Beckner et al. on May 27, 1986 and in AT&T Technical Journal, Vol. 64, No. 6, Part 2, pp. 1305–1564 or other similar switching system and a peripheral device, such as a Sun® workstation. If a manufacturer went out of business or some components were no longer manufactured, there would be no available means to create the link.

Referring again to FIG. 1, currently only specific Administrative Service Modules (ASM's) 14 can be connected to a switching system. The use of Dual Serial Channel (DSCH) cabling 20 limits the number of peripherial devices that can be connected to the switching system to an ASM 14 that can connect to the DSCH cable 20. It is desirable to connect other peripherial devices, such as workstations, dumb terminals, personal computers (PC's) or communications modules (CM's), to the switching system other than specific ASM's. This connection would create configuration flexibility, providing a larger number of peripherial devices to be used with the switching system. The resultant flexibility will support increased call capacity, increased revenue, and lower costs.

FIG. 1 illustrates the use of DSCH cabling 20 to connect between the switching system and the peripheral device. Use of DSCH cabling 20 limits the length of the link between communications equipment to a maximum 100 feet between the switching system and the peripheral device. Therefore, distance constraints limit where peripheral devices may be located, usually requiring the peripheral device to reside within the room containing the switching system. The Network Equipment Building System (NEBS) Bellcore standard for generic equipment requires equipment within the room containing the switching system to meet certain constraints. Because NEBS compliant peripherals are more costly, removing the peripheral device from the switching room will reduce costs while at the same time adding flexibility.

It is an object of the invention to provide a method and apparatus to enable communication between a series of networked communications equipment, each potentially using a different data and command exchange protocol and providing a redundant data path in the event of primary path failure. The invention allows a larger number of different types of peripheral devices to be used with switching systems that employ DSCH cabling 20, providing increased call capacity, increased revenue, and lower overall costs.

SUMMARY OF THE INVENTION

In accordance with one aspect of the invention, the foregoing object is achieved by providing a device that will convert from a first protocol to a second, different protocol. The invention provides a means for linking unlike communications equipment. The device provides both a first interface for sending and receiving data and commands in a first protocol such as DSCH and a second interface for sending and receiving data and commands in a second, different protocol such as Ethernet. The device converts from the first data and command exchange protocol to the second data and command exchange protocol using a series of interconnected circuitry including a microcontroller.

The invention includes a controller that is capable of receiving data and commands at the first interface and the second interface simultaneously. Moreover, any one or more of the steps of the invention of receiving data and commands at the first interface in the first data and command exchange protocol and receiving data and commands at the second interface in the second data and command exchange protocol, sending the converted data and commands to the second interface and sending the converted data and commands to the second interface, converting the data and commands from the first data and command exchange protocol to the second data and command exchange protocol, converting the data and commands from the second data and command exchange protocol to the first data and command exchange protocol may occur simultaneously.

BRIEF DESCRIPTION OF THE DRAWINGS

Features of this invention will be understood best from the following detailed description taken in conjunction with the drawings.

DETAILED DESCRIPTION OF THE PREFERRED EMBODIMENT

In the following discussion, the present invention is discussed in terms of Ethernet and DSCH protocols associated with coupling a switching system with a peripheral device, but other protocols could be used without departing from the intended scope of the present invention.

The networked device itself is defined as data terminal equipment (DTE) 72 in the IEEE standard. Each DTE 72 attached to an Ethernet is equipped with an Ethernet interface. In accordance with the present description of the invention, the term DTE 72 refers to, for example, a workstation, a dumb terminal, a personal computer (PC), or a communications module (CM). The Ethernet interface provides a connection to the Ethernet media system and contains the electronics and software needed to perform the media access control functions required to send a data frame over the Ethernet.

Figure 2:
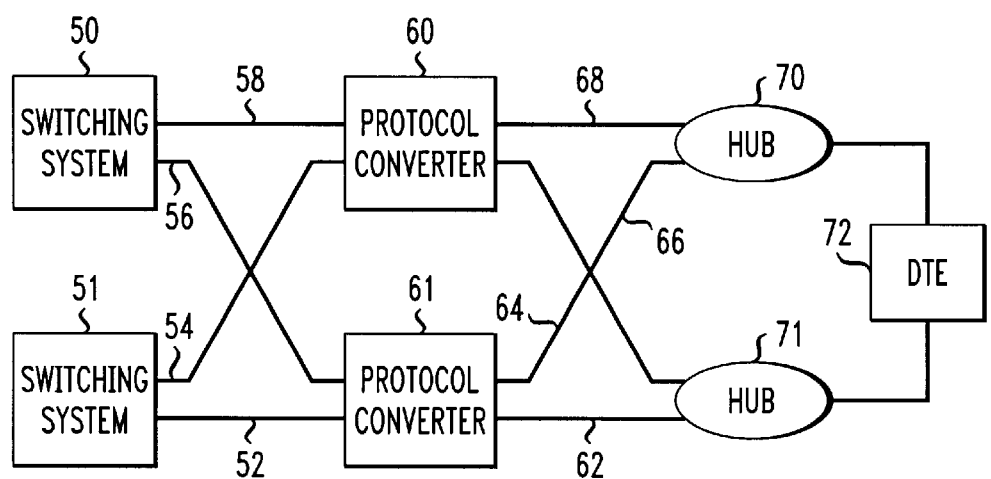
FIG. 2 illustrates one example embodiment of the use of the protocol converter in a typical switching environment.

FIG. 2 shows a block diagram of the use of a protocol converter in a typical switching environment. In a preferred embodiment, switching system 50 could be a Lucent 5ESS® Switch described previously or it could be a Lucent 3B® processor. While a specific switching system 50 has been described, it will be appreciated that any switching system may be provided which is similar to the specific switching system 50 described above.

In FIG. 2, a protocol converter 60 is illustrated which converts data frames which may contain data, commands, or messages from a first data and command exchange protocol to a second, possibly different data and command exchange protocol. In a preferred embodiment, protocol converter 60 is coupled to the switching system 50 via a DSCH cable (52, 54, 56, 58). The DSCH cable is a half-duplex, two signal communication link that operates at a 10 MHZ rate. Taking into account the two signal leads, this provides for a maximum transfer rate of 20 Mbs in one direction. At the physical layer, there are five signals on a DSCH cable specified in the following table:

| Signal | Description |
| --- | --- |
| GENREQ | Service request. 150nS pulse = transfer, 350 nS = setup, 550 nS = interrupt |
| DATAH | High 16 bits of data |
| DATAL | Low 16 bits of data |
| XCLK | Transmit clock |
| RCLK | Receive clock |

All signals are differentially driven using industry standard differential driver and receiver chips. The physical connection using DSCH cabling is referred to as the physical layer.

Figure 1:
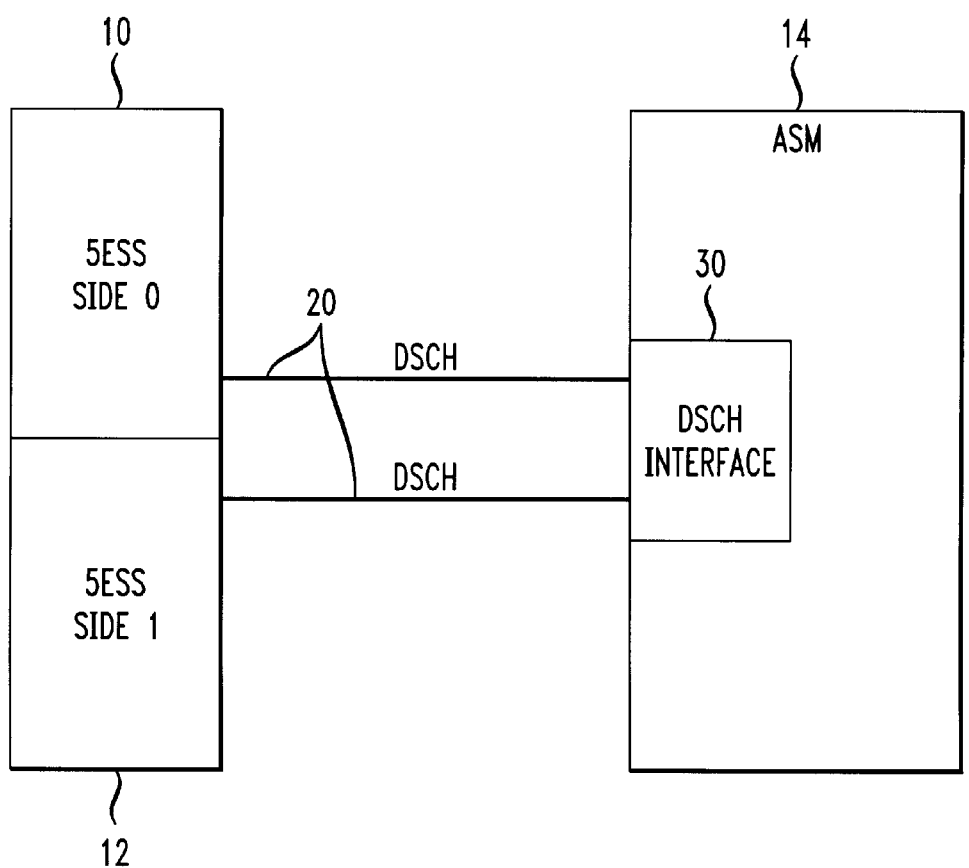
FIG. 1 illustrates the prior art method of connecting a communications device to a peripheral device wherein each device uses a different protocol.
Figure 1A:
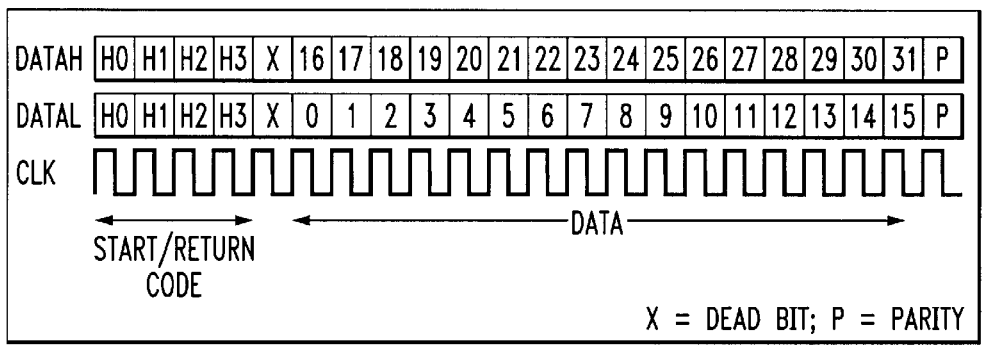
FIG. 1A illustrates the DSCH data frame format including the start codes and the return codes.

The data link layer of the DSCH transports the data frames between the DSCH connected devices. The format of the frame is illustrated in FIG. 1A. A frame starts with a start code, followed by a "dead bit" which is unused, then optionally followed by data and finally a parity bit. The peripheral device responds with a return code, a dead bit, and optionally read data and finally a parity bit. Operations that are "block mode" contain 64 bytes of data.

FIG. 2, also illustrates a second interface for the protocol converter 60 allowing it to be coupled to the chosen DTE 72. In a preferred embodiment, protocol converter 60 is linked to a hub 70 via link 68. The chosen DTE 72 is connected to the hub such that a greater number of peripheral devices can be connected to protocol converter 60. When the Ethernet protocol is used, the hub allows the distance between protocol converter 60 and a DTE to increase. While the DTE 72 could be connected directly to the protocol converter 60, the addition of the hub 70 which is connected to the protocol converter 60 allows for an increase in the number of DTE 72 connected to protocol converter 60 and the distance DTE 72 can be located from protocol converter 60. It is to be understood that the output of the protocol converter to be carried on links 62, 64, 66, and 68 could be Ethernet, Asynchronous Transfer Mode (ATM), or ISDN.

FIG. 2 further illustrates the redundant aspect of the invention which is accomplished by cross connecting. Switching system 50 and switching system 51 are provided and both are identical systems. Protocol converter 60 and protocol converter 61 are provided, each having at least one, and in the preferred embodiment, two input and output interfaces for receiving and sending data commands in a first protocol and a second, different protocol.

Switching system 50 and switching system 51 use a first data and command exchange protocol. Switching system 50 is connected to protocol converter 60 via link 58, which in the illustrated embodiment is DSCH cabling. Switching system 50 is also connected to protocol converter 61 via link 56, which also uses DSCH cabling in the illustrated embodiment. Switching system 51 is connected to protocol converter 60 via link 54, which in the illustrated embodiment is DSCH cabling. Switching system 51 is also connected to protocol converter 61 via link 52, which in the illustrated embodiment is DSCH cabling.

Hub 70 and hub 71 use a second, different data and command exchange protocol. The chosen DTE 72 will connect to hub 70 and hub 71 which demonstrates the redundant aspect of the connection. Hub 70 is connected to protocol converter 60 via link 68, employing the Ethernet protocol. Hub 70 is also connected to protocol converter 61 via link 66, which in the illustrated embodiment is Ethernet. Hub 71 is connected to protocol converter 60 via link 64, which in the illustrated embodiment is Ethernet. Hub 71 is also connected to protocol converter 61 via link 62, which in the illustrated embodiment is Ethernet.

By connecting the network in the manner described above, the redundant aspects of the invention provide backup support in the event of primary path failure. Primary path failure might involve failure of switching system 50, allowing the redundant switching system 51 to take over. Both protocol converter 60 and protocol converter 61 are coupled to switching system 51, so there is no down time to make the connection. Similarly, if either protocol converter 60 or protocol converter 61 were to fail, both switching system 50 and switching system 51 would still be connected to hub 70 and hub 71, maintaining the link between either switching system and any DTE connected to hub 70 and hub 71.

Figure 3:
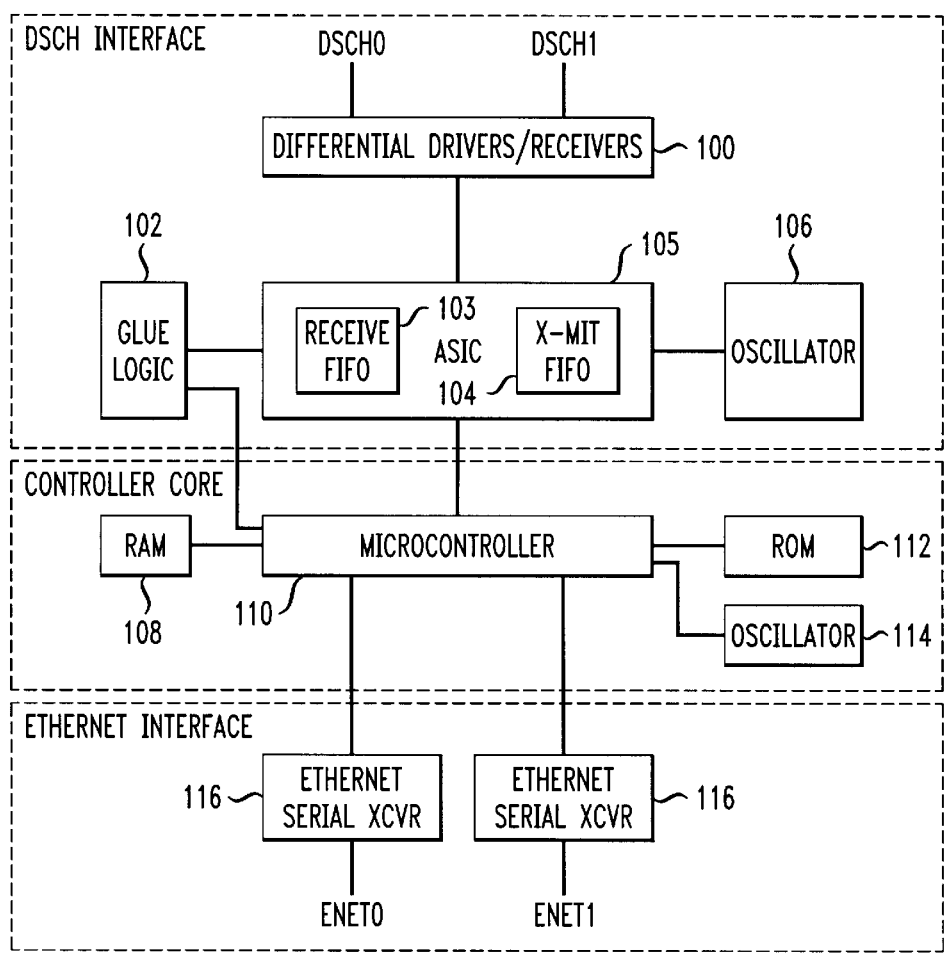
FIG. 3 is a block diagram of the components used in the protocol converter.

FIG. 3 is a block diagram of the components used in the protocol converter 60. In the illustrated preferred embodiment, the signal coming into the protocol converter 60 is either Ethernet or DSCH, however it is to be understood that modifications of some of the components will allow for the use of ATM or ISDN in addition to Ethernet.

Referring more particularly to FIG. 3, a DSCH signal is introduced to the differential drivers/receivers 100 via DSCH0 or via DSCH1 which represent the DSCH cabling. Differential drivers/receivers 100 convert the signal from serial differential to serial single ended TTL. The serial single ended TTL is presented to the application specific integrated circuit (ASIC) 105. In a preferred embodiment, the ASIC 105 is a DDBIC chip manufactured by Lucent Microelectronics. ASIC 105 provides a 16 bit bus interface for interfacing to microcontroller 110. ASIC 105 converts from serial single ended TTL to parallel single ended TTL. The ASIC 105 also performs a protocol check to make sure the logical protocol was followed.

If the protocol check is successful and everything is in order, the converted data is placed into a receive FIFO 103, which is contained within ASIC 105. The receive FIFO 103 is a buffer for the data where the data that is transmitted to the buffer first is the first data read by the microcontroller 110. When the receive FIFO 103 acquires all of the data, a message is sent to the microcontroller 110 notifying the microcontroller 110 that all of the data has arrived at the receive FIFO 103. Glue logic 102 provides proper timing signals and positive and negative logic conversions to allow the ASIC 105 to be interfaced with the microcontroller 110. The oscillator 106 provides timing signals to the ASIC 105.

After the microcontroller 110 receives notification that the data has been received by the receive FIFO 103, the data is read into RAM 108. The microcontroller 110 proceeds to packetize the data for Ethernet in single ended TTL format. The microcontroller also interprets the proper destination for the data and prepares it to be sent to either Enet0 or Enet1 which represent the Ethernet connections. The oscillator 114 provides timing signals for the microcontroller 110. ROM 112 provides the software to control the processes performed by the microcontroller.

The signal leaving the microcontroller 114 is single ended TTL format. Ethernet serial transceivers 116 convert from single ended TTL format to Ethernet format. The signal is transmitted to the destination through Enet0 or Enet1.

In another preferred embodiment, an Ethernet-format signal is introduced to either Enet0 or Enet1 which represent the Ethernet cabling. The Ethernet signal is converted to single ended TTL by Ethernet serial transceivers 116. The converted single ended TTL signal is introduced to the microcontroller 110. The portion of the microcontroller 110 able to read and translate Ethernet receives the single ended TTL signal and places it in RAM 108. The microcontroller 110 reads and examines the data and manipulates it into blocks. The blocks are placed into the transmit FIFO 104, which resides in ASIC 105. The transmit FIFO 104 transmits a signal to the DSCH whereas the receive FIFO 103 receives a signal from the DSCH.

When the receive FIFO 103 has received the data in its entirety, the ASIC 105 converts the data from parallel single ended TTL logic to serial single ended TTL and sends the data to the differential drivers/receivers 100. The serial single ended TTL is converted by the differential drivers/receivers 100 to serial differential and sent to either DSCH0 or DSCH1.

While the invention has been described with reference to several noted embodiments, it is understood that the words which have been used herein are words of description, rather than words of limitation. Changes may be made within the purview of the appended claims, without departing from the scope and spirit of the invention and its aspects. Although the invention has been described herein in reference to particular means, materials and/or embodiments, it is understood that the invention is not to be limited to the particulars disclosed herein, and the invention extends to all equivalent structures, methods and uses, such as are within the scope of the appended claims.

What is claimed is:

1. Apparatus for coupling communication equipment utilizing different data and command exchange protocols to transfer data and commands, comprising:
   a first interface for receiving and sending data and commands in a first data and command in a DSCH protocol;
   a second interface for sending and receiving data and commands in a second, different data and command exchange protocol;
   a controller, coupled to said first and second interface, capable of receiving data and commands at said first interface in said DSCH protocol converting said data and commands from said first data and command exchange protocol to said second data and command exchange protocol, and sending the converted data and commands to said second interface.

2. The apparatus of claim 1, further comprised of a controller capable of receiving data and commands at said second interface in said second data and command exchange protocol, converting said data and commands from said second data and command exchange protocol to said first data and command exchange protocol, and sending the converted data and commands to said first interface.

3. The apparatus of claim 2, further comprised of a controller capable of receiving data and commands at said first interface and/or said second interface simultaneously.

4. The apparatus of claim 3, where said controller further comprises:
   at least one buffer for storing said data and commands.

5. The apparatus of claim 3, where said second data and command exchange protocol is Ethernet.

6. The apparatus of claim 3, where said second data and command exchange protocol is ATM.

7. The apparatus of claim 3, where said second data and command exchange protocol is ISDN.

8. Apparatus for coupling communication equipment utilizing different data and command exchange protocol to transfer data and commands, where said communication equipment includes at least one data terminal equipment, comprising:
   a first interface for receiving and sending data and commands in a DSCH protocol;
   a second interface, coupled to said at least one data terminal equipment, for sending and receiving Ethernet format data and commands;
   a controller, coupled to said first and second interface, capable of receiving data and commands at said first interface in said DSCH protocol, converting said data and commands from said DSCH protocol to said Ethernet format, and sending said converted data and commands to said at least one data terminal equipment through said second interface.

9. The apparatus of claim 8, further comprised of a controller capable of receiving data and commands from said at least one data terminal equipment at said second interface in said Ethernet format, converting said data and commands from said Ethernet-format to said DSCH protocol, and sending said converted data and commands to said first interface.

10. The apparatus of claim 9, further comprised of a controller capable of receiving data and commands at said first interface and/or said second interface simultaneously.

11. The apparatus of claim 10, where said controller further comprises:
   at least one buffer for storing said data and commands.

12. The apparatus of claim 11 where said first interface is redundant and either interface can be selected dynamically.

13. The apparatus of claim 12 where said second interface is redundant and either interface can be selected dynamically.

14. Apparatus for coupling at least one communications switch to at least one data terminal equipment using different data and command exchange protocols to transfer data and commands, comprising:
   a first interface coupled to said at least one communications switch for receiving and sending data and commands in DSCH protocol;

a second interface coupled to said at least one data terminal equipment for receiving and sending Ethernet format data and commands;

a controller, coupled to said at least one communications switch at said first interface and said at least one data terminal equipment at said second interface, capable of receiving data and commands from said at least one communications switch at said first interface in said DSCH protocol, converting said data and commands from said DSCH protocol to said Ethernet format, and sending said converted data and commands to said at least one data terminal equipment through said second interface.

15. The apparatus of claim 14, further comprised of a controller capable of receiving data and commands from said at least one data terminal equipment at said second interface in said Ethernet format, converting said data and commands from said Ethernet format to said DSCH protocol, and sending said converted data and commands to said at least one communications switch through said first interface.

16. The apparatus of claim 15 where said controller is capable of receiving data and commands at said first interface and/or said second interface simultaneously.

17. The apparatus of claim 16, where said controller further comprises:

at least one buffer for storing said data and commands.

18. The apparatus of claim 17 where said first interface is coupled to a Lucent Technologies 5ESS® Switch.

19. The apparatus of claim 17 where said first interface is coupled to a Lucent Technologies 3B® processor.

20. A DSCH protocol to a second, different data and command exchange protocol comprising the steps of:

receiving data and commands at a first interface in a DSCH protocol;

converting said data and commands from said DSCH protocol to said second data and command exchange protocol; and sending the converted data and commands to a second interface.

21. The method of claim 20 further comprising the steps of:

receiving data and commands at said second interface in said second data and command exchange protocol;

converting said data and commands from said second data and command exchange protocol said DSCH protocol; and sending the converted data and commands to said first interface.

22. The method of claim 21 wherein any one or more of the steps of receiving data and commands at said first interface in said DSCH protocol and receiving data and commands at said second interface in said second data and command exchange protocol converting said data and commands from said DSCH protocol to said second data and command exchange protocol and converting said data and commands from said second data and command exchange protocol to said DSCH protocol, sending the converted data and commands to said second interface and sending the converted data and commands to said first interface may occur simultaneously.

23. The method of claim 22 where said second data and command exchange protocol is Ethernet.

24. The method of claim 23 where said step of converting said data and commands from said DSCH protocol to said second data and command exchange protocol further comprises the steps of:

receiving data and commands in a differential format;

translating said differential format to a TTL format; and converting said TTL format to an Ethernet format.

25. The method of claim 24 where said step of converting said data and commands from said second data and command exchange protocol to said DSCH protocol further comprises the steps of:

receiving data and commands in an Ethernet format;

translating said Ethernet format to a TTL format; and converting said TTL format to a differential-format.

26. The method of claim 22 where said second data and command exchange protocol is ATM.

27. The method of claim 22 where said second data and command exchange protocol is ISDN.

* * * * *